United States Patent
Saad et al.

(10) Patent No.: US 11,824,763 B2
(45) Date of Patent: *Nov. 21, 2023

(54) FILTERING TOPOLOGIES FOR PATH COMPUTATION IN MASSIVELY SCALED NETWORKS

(71) Applicant: Juniper Networks, Inc., Sunnyvale, CA (US)

(72) Inventors: Tarek Saad, Ottawa (CA); Raveendra Torvi, Nashua, NH (US); Vishnu Pavan Kumar Beeram, Ashburn, VA (US); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/645,225

(22) Filed: Dec. 20, 2021

(65) Prior Publication Data

US 2022/0158931 A1  May 19, 2022

Related U.S. Application Data

(63) Continuation of application No. 17/097,549, filed on Nov. 13, 2020, now Pat. No. 11,252,082.

(51) Int. Cl.
*H04L 45/24* (2022.01)
*H04L 45/02* (2022.01)
(Continued)

(52) U.S. Cl.
CPC .......... *H04L 45/24* (2013.01); *H04L 43/0882* (2013.01); *H04L 45/02* (2013.01); *H04L 45/04* (2013.01); *H04L 45/123* (2013.01)

(58) Field of Classification Search
CPC ..... H04L 45/24; H04L 43/0882; H04L 45/02; H04L 45/04; H04L 45/123
See application file for complete search history.

(56) References Cited

U.S. PATENT DOCUMENTS 7,593,340 B2  9/2009  Li et al.
7,821,951 B2  10/2010  Douville
(Continued)

FOREIGN PATENT DOCUMENTS

CN      1816000 A    8/2006
CN    101083548 A   12/2007
(Continued)

OTHER PUBLICATIONS

First Office Action and Search Report, and translation thereof, from counterpart Chinese Application No. 202110157295.3 dated Oct. 9, 2022, 18 pp.

(Continued)

*Primary Examiner* — Abdulkader M Alriyashi
(74) *Attorney, Agent, or Firm* — Shumaker & Sieffert, P.A.

(57) ABSTRACT

An example network element includes one or more interfaces and a control unit, the control unit includes one or more processors configured to determine an egress network domain identifier (ID) and determine an abstracted interdomain network topology. The one or more processors are also configured to determine one or more interdomain paths from an abstracted ingress domain node to an abstracted egress domain node and determine whether an abstracted domain node is on the one or more interdomain paths. The one or more processors are configured to, based on the abstracted domain node being on the one or more interdomain paths, include one or more resources within a network domain in a filtered traffic engineering database (TED) and compute a path from an ingress node within the ingress network
(Continued)

domain to an egress node within the egress network domain based on the filtered TED.

20 Claims, 7 Drawing Sheets

(51) Int. Cl.
    *H04L 45/12*     (2022.01)
    *H04L 43/0882*     (2022.01)

(56) References Cited

U.S. PATENT DOCUMENTS

| | | | |
|---|---|---|---|
| 9,203,702 | B2 | 12/2015 | Yabusaki et al. |
| 9,749,214 | B2 | 8/2017 | Han |
| 2008/0002664 | A1 | 1/2008 | Li et al. |
| 2013/0242804 | A1 | 9/2013 | Yabusaki et al. |
| 2015/0078163 | A1 | 3/2015 | Bryskin |
| 2015/0341255 | A1 | 11/2015 | Lu et al. |
| 2016/0087874 | A1 | 3/2016 | Chen |
| 2018/0367409 | A1 | 12/2018 | Zhang et al. |
| 2019/0349286 | A1 | 11/2019 | Bruno et al. |

FOREIGN PATENT DOCUMENTS

| | | |
|---|---|---|
| CN | 102014073 A | 4/2011 |
| CN | 106063203 A | 10/2016 |
| CN | 108966053 A | 12/2018 |
| EP | 2043310 A1 | 4/2009 |
| JP | 2013191942 A | 9/2013 |

OTHER PUBLICATIONS

Response to Communication Pursuant to Rule 69 EPC dated May 31, 2022, from counterpart European Application No. 21154635.3, filed Nov. 18, 2022, 28 pp.

King et al., "Applicability of the Path Computation Element to Inter-area and Inter-AS MPLS and GMPLS Traffic Engineering", Internet Engineering Task Force, RFC 8694, Dec. 2019, 15 pp.

Bashandy et al. "Segment Routing with the MPLS Data Plane" RFC 8660, Internet Engineering Task Force (IETF), Dec. 2019, 29 pp.

Coltun et al., "OSPF for IPV6," Network Working Group, RFC 5340, Jul. 2008, 95 pp.

Enns et al., "Network Configuration Protocol (NETCONF)," RFC 6241, Internet Engineering Task Force, IETF, Jun. 2011, 113 pp.

Extended Search Report from counterpart European Application No. 21154635.3, dated Jul. 19, 2021, 16 pp.

Filsfils et al. "Segment Routing Architecture" Internet Engineering Task Force (IETF), RFC 8402, Jul. 2018, 32 pp.

Filsfils et al. "Segment Routing Policy Architecture" draft-ietf-spring-segment-routing-policy-06.txt, Spring Working Group, Internet-Draft, Dec. 14, 2019, 35 pp.

Filsfils et al. "Segment Routing Use Cases" draft-filsfils-spring-segment-routing-use-cases-01, Network Working Group, Internet-Draft, Oct. 21, 2014, 35 pp.

Gredler et al., "North-Bound Distribution of Link-State and Traffic Engineering (TE) Information Using BGP," RFC 7752, Internet Engineering Task Force (IETF), Mar. 2016, 48 pp.

King et al. "Applicability of the Path Computation Element to Inter-Area and Inter-AS MPLS and GMPLS Traffic Engineering" draft-ietf-pce-inter-area-as-applicability-08, PCE Working Group, Internet Draft, Jul. 8, 2019, 25 pp.

Li et al., "IS-IS Extensions for Traffic Engineering," Network Working Group, RFC 5305, Oct. 2008, 18 pp.

Indem et al. "OSPFv3 Link State Advertisement (LSA) Extendibility" Internet Engineering Task Force (IETF), RFC 8362, Apr. 2018, 33 pp.

Moy, "OSPF Version 2," Network Working Group, RFC 2328, Apr. 1998, 244 pp.

Notice of Allowance from U.S. Appl. No. 17/097,549, dated Oct. 14, 2021, 9 pp.

Oran, "OSI IS-IS Intra-domain Routing Protocol," RFC 1142, Network Working Group, Feb. 1990, 157 pp.

Previdi et al., "Source Packet Routing in Networking (Spring) Problem Statement and Requirements," RFC 7855, Internet Engineering Task Force (IETF), May 2016, 19 pp.

Sheth et al., "OSPF Hybrid Broadcast and Point-to-Multipoint Interface Type," RFC 6845, Internet Engineering Task Force, IETF, Jan. 2013, 9 pp.

U.S. Appl. No. 17/097,549, filed Nov. 13, 2020, naming inventors Saad et al.

Vasseur et al., "Path Computation Element (PCE) Communication Protocol (PCEP)," RFC 5440, Network Working Group, Mar. 2009, 76 pp.

FILTERING TOPOLOGIES FOR PATH COMPUTATION IN MASSIVELY SCALED NETWORKS

This application is a continuation of U.S. application Ser. No. 17/097,549, filed Nov. 13, 2020, the entire content of which is herein incorporated by reference.

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form. Certain devices (i.e., nodes) within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols fall within a protocol class referred to as Interior Gateway Protocol (IGP) in which flooding-based distribution mechanisms are used to announce topology information to routers within the network. These routing protocols typically rely on routing algorithms that require each of the routers to have synchronized routing topology information for a given domain, referred to as the IGP area or domain.

Packet-based networks increasingly utilize label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing MPLS protocols, label switching routers can forward traffic along a particular path through a network to a destination device, i.e., a Label Switched Path (LSP), using labels prepended to the traffic. An LSP defines a distinct path through the network to carry MPLS packets from the source device to a destination device. Routers may employ segment routing techniques, such as by using a Source Packet Routing in Networking (SPRING) paradigm, to advertise network segments between nodes using an IGP and build single or multi-hop tunnels within an IGP domain. To perform segment routing, an ingress router adds one or more labels in a label stack, e.g., a segment list, to a packet, and intermediate routers along the path remove labels from the label stack applied to the packet as the packet is forwarded through the network.

SUMMARY

In general, this disclosure describes techniques for determining an interdomain path for routing network traffic.

According to the disclosed techniques, a network element, such as a router or a network controller may calculate an interdomain path through the use of abstracted domain nodes representative of network domains and a filtered traffic engineering database (TED) that may include express segments, nodes and/or links on one or more interdomain paths from an ingress node to an egress node.

In one example, this disclosure is directed to a method that includes determining an egress network domain identifier (ID) of an egress network domain, based on the egress network domain ID, determining an abstracted interdomain network topology, wherein the abstracted interdomain network topology includes an abstracted ingress domain node, an abstracted egress domain node, and an abstracted first domain node, wherein the abstracted ingress domain node includes an abstraction of all nodes within an ingress network domain, wherein the abstracted egress domain node includes an abstraction of all nodes within the egress network domain, and wherein the abstracted first domain node includes an abstraction of all nodes within a first network domain, determining one or more interdomain paths from the abstracted ingress domain node to the abstracted egress domain node, determining whether the abstracted first domain node is on the one or more interdomain paths, based on the abstracted first domain node being on the one or more interdomain paths, including one or more resources within the first network domain in a filtered traffic engineering database (TED), and computing a path from an ingress node within the ingress network domain to an egress node within the egress network domain based on the filtered TED.

In another example, this disclosure is directed to a network element including one or more interfaces; and a control unit in communication with the one or more interfaces, the control unit comprising one or more processors configured to: determine an egress network domain identifier (ID) of an egress network domain; based on the egress network domain ID, determine an abstracted interdomain network topology, wherein the abstracted interdomain network topology includes an abstracted ingress domain node, an abstracted egress domain node, and an abstracted first domain node, wherein the abstracted ingress domain node includes an abstraction of all nodes within an ingress network domain, wherein the abstracted egress domain node includes an abstraction of all nodes within the egress network domain, and wherein the abstracted first domain node includes an abstraction of all nodes within a first network domain; determine one or more interdomain paths from the abstracted ingress domain node to the abstracted egress domain node; determine whether the abstracted first domain node is on the one or more interdomain paths; based on the abstracted first domain node being on the one or more interdomain paths, include one or more resources within the first network domain in a filtered traffic engineering database (TED); and compute a path from an ingress node within the ingress network domain to an egress node within the egress network domain based on the filtered TED.

In a further example, this disclosure is directed to a non-transitory computer-readable storage medium storing instructions, which, when executed, cause one or more processors to determine an egress network domain network identification (ID) of an egress network domain, based on the egress network domain ID, determine an abstracted interdomain network topology, wherein the abstracted interdomain network topology includes an abstracted ingress domain node, an abstracted egress domain node, and an abstracted first domain node, wherein the abstracted ingress domain node includes an abstraction of all nodes within an ingress network domain, wherein the abstracted egress domain node includes an abstraction of all nodes within the egress network domain, and wherein the abstracted first domain node includes an abstraction of all nodes within a first network domain, determine one or more interdomain paths from the abstracted ingress domain node to the abstracted egress domain node, determine whether the abstracted first domain node is on the one or more interdomain paths, based on the abstracted first domain node being on the one or more interdomain paths, include one or more resources within the first network domain in a filtered traffic engineering database (TED), and compute a path from an ingress node within the ingress network domain to an egress node within the egress network domain based on the filtered TED.

The details of one or more examples are set forth in the accompanying drawings and the description below. Other features, objects, and advantages will be apparent from the description, drawings, and from the claims.

DETAILED DESCRIPTION

Accurate and fast path computation of optimal paths may be important during network convergence. Most routing algorithms have an order of complexity that is dependent on the number of nodes and links in a network. For example, for massively large network topologies, path computation time may increase drastically with an increasing number of nodes and/or links. This drastic increase in path computation time may lead to much longer convergence times in the network. This drastic increase in computation time may also be especially pronounced when the path of a flow in the network is determined by a single network element (e.g., an ingress label edge router (LER) or a path computation element (PCE) in a network controller on behalf of many ingress LERs). In general, the larger the network is, the larger the number of requests for path computation. In some cases, later requests for path computation may take longer to complete as requests are queued to be processed which could increase the chance(s) of network congestion during a convergence event.

When determining a path in a large network, one may want to search for an optimal path. This search space may include all nodes and links in the network. To reduce the time a network element takes to search, one may want to limit the search space so as to eliminate nodes and links that are known to not be part of the path prior to performing the search. For example, if one has the full native topology available, one can filter a subset of nodes and/or links that are relevant to the path computation request. Link state messages may be exchanged and stored in a link state data base (LSDB). The subset may be filtered into a filtered TED base or a plurality of filtered TEDs. For example, a network operator may define a filter to extract the subset from the full network topology. In some examples, the topology may be further constrained, for example, in a capacity-based, domain-based, or other manner.

Figure 1:
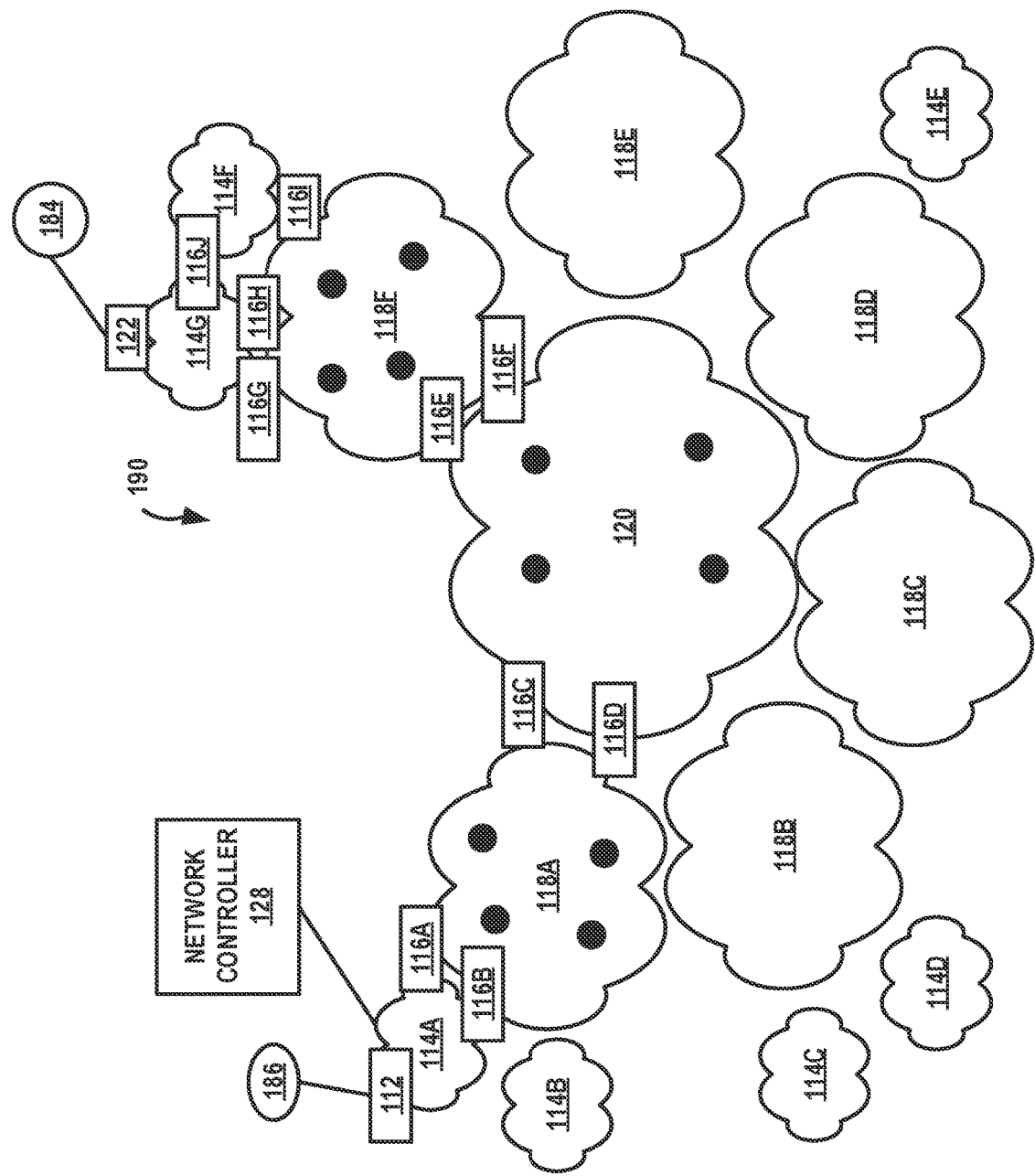
FIG. 1 is a block diagram illustrating an example network that supports use of a filtered TED in accordance with techniques of this disclosure.

FIG. 1 is a block diagram illustrating an example network that supports use of a filtered TED in accordance with techniques of this disclosure. In some examples, an optimal path in a massively large network, such as interdomain network 190, may go from one access node to another by traversing an ingress access network domain 114A (also referred to herein as ingress network domain 114A), a metro network domain 118A, a core network domain 120, a metro network domain 118F, and an egress access network domain 114G (also referred to herein as egress network domain 114G). In some examples, another path may also include access network domain 114F between metro network domain 118F and egress network domain 114G. These paths may typically be computed by a border gateway protocol (BGP), shortest autonomous system interdomain path as the best or optimal path (which may be based on a shortest hop count). Once the shortest interdomain path is determined, a path computation device, such as the PCE on a requesting router or a network controller, may look in each domain to find shortest/best path within each domain. Without the filtering techniques of this disclosure, the PCE on a network element such as a requesting router or a network controller would be presented with full topology of the massively large network to perform a path computation.

According to the techniques of this disclosure, a network element may reduce the search space by reducing the size of the topology on which the network element runs the path computation. This reduction in the size of the topology may improve convergence in massively large networks. For example, some nodes may not be able to contribute to the end-to-end path. A network element may not need to consider such nodes when calculating the path.

In some examples, a relevant subset of the topology of the overall topology is included in a filtered TED. A full link state (LS) table in a LS database may be filtered to determine relevant links/nodes which may be on one or more relevant interdomain paths. In some examples, there may be a plurality of TEDs, such as one TED per egress domain or one per each egress domain-virtual private network (VPN) combination. For example, a network element may filter out a subset of nodes or paths based on the request. For example, the network element may use a link state, such as a border gateway protocol (BGP) link state, an interior gateway protocol (IGP) link state, etc. to determine the subset. An interdomain path has an ingress node and an egress node. The network element may use information relating to the ingress node and the egress node to determine the subset of network domains to be searched during the interdomain path calculation.

In some examples, the network element may use topological filters to determine the subset of network domains (e.g., which network domains may be on one or more interdomain paths to the egress network domain). In some examples, the network element may also use constrained filters so as to only select nodes and/or links in the network domains on the one or more interdomain paths that meet additional constraints, such as at least a predetermined bandwidth, less than a predetermined latency, less than a predetermined jitter, etc. In some examples, the network element may use domain IDs for filtering border nodes and connected egress peering engineering (EPE), express segments, and/or Segment-Routing Identifiers (SIDs).

In the example of FIG. 1, interdomain network 190 includes access network domains 114A-114G (collectively access network domains 114). Interdomain network 190 also includes metro network domains 118A-118F (collectively metro network domains 118). Interdomain network 190 also includes core network domain 120. Border nodes 116A-116J (collectively border nodes 116) are also depicted. Each of border nodes 116 may belong to or be associated with two or more network domains. Border nodes 116 may include border routers. Ingress node 112 may be an ingress router, such as a provider edge router, that may be configured to provide ingress to ingress access network domain 114A. In some examples, a path computation engine (PCE) of network controller 128 may calculate one or more interdomain paths from ingress node 112 to egress node 122. In other examples, a ingress node 112 may calculate one or more interdomain paths from ingress node 112 to egress node 122.

Border nodes 116A and 116B belong to or are associated with both ingress access network domain 114A and metro network domain 118A, and may provide access from ingress access network domain 114A to metro network domain 118A. Border nodes 116C and 116D belong to or are associated with both metro network domain 118A and core network domain 120, and may provide access from metro network domain 118A to core network domain 120. Border nodes 116E and 116F belong to or are associated with both core network domain 120 and metro network domain 118F, and may provide access from core network domain 120 to metro network domain 118F. Border nodes 116G-116H belong to or are associated with both metro network domain 118F and egress access network domain 114G, and may provide access from metro network domain 118F to egress access network domain 114G. Egress node 118 may be a network element, such as a provider edge router, that may be configured to provide egress from egress access network domain 114G. For example, subscriber device 184 may connect to egress node 118 to obtain packets from egress access network domain 114G. Additionally, border node 116I belongs to or is associated with both metro network domain 118F and access network domain 114F, and may provide access between metro network domain 118F and access network domain 114F. Border node 116J belongs to or is associated with both access network domain 114F and egress access network domain 114G, and may provide access between access network domain 114F and egress access network domain 114G.

In some examples, each of the network domains of FIG. 1 may each comprise an Interior Gateway Protocol (IGP) area or domain that includes a set of nodes (such as routers) under common administrative control and that share a common routing protocol. Example IGPs include Intermediate System-Intermediate System (IS-IS) and Open Shortest Path First (OSPF). In the illustrated example of FIG. 1, border nodes 116 may comprise border routers at the border of and between the different network domains. Although not shown in FIG. 1, each of access network domains 114, metro network domains 118 and core network domain 120 may include one or more other network elements that operate as transit routers or switches to forward traffic within the respective domains and between border nodes 116.

Metro network domains 118A and 118F and core network domain 120 are shown having IGP nodes represented by the dots within the networks. While not shown in every network domain for simplicity purposes, each of access network domains 114, metro network domains 118, and core network domain 120 may include a plurality of IGP nodes.

As illustrated in FIG. 1, ingress access network domain 114A also may be coupled to a network controller 128, which may operate as a software defined networking (SDN) controller or other centralized controller that provides control plane operations and management for routers and other network devices within one or more of access network domains 114, metro network domains 118, and core network domain 120. For purposes of explanation, network controller 128 is described herein as providing control plane operations and management for at least ingress access network domain 114A. In other examples, each of access network domains 114, metro network domains 118 and core network domain 120 may include a designated, centralized controller.

The sources of the network traffic received by ingress node 112 may comprise one or more devices (not shown) and/or any public or private network or the Internet that provides traffic to ingress node 112 in interdomain network 190. Furthermore, in some examples, egress node 122 may serve as an egress router. The destinations of the network traffic being forwarded through interdomain network 190 may comprise one or more destination devices, such as subscriber device 184, and/or networks that may include LANs or wide area networks (WANs) that comprise a plurality of devices. For example, destination devices may include personal computers, laptops, workstations, personal digital assistants (PDAs), wireless devices, network-ready appliances, file servers, print servers or other devices that access the source via interdomain network 190.

In the example of FIG. 1, border nodes 116 may use segment routing techniques, e.g., a SPRING paradigm, to advertise segments between nodes using an IGP or BGP and build single or multi-hop tunnels within each of access network domains 114, metro network domains 118, and core network domain 120. Segment routing may engage IGPs or BGP for advertising multiple types of segments. A first example type of segment is an "adjacency segment" that represents a strict-forwarded, typically single-hop tunnel that carries packets over a specific link between a router and a specific node, irrespective of the link cost. A second example type of segment is a "prefix segment" that represents a typically multi-hop tunnel using least cost path links between a router and to a specific address prefix. A third example type of segment is a "binding segment" that represents a specific intradomain tunnel between a router and a specific node or a specific address prefix.

Another example type of a segment is an express segment. An express segment is a virtual link from one border node to another border node. For example, an express segment is a SID that is an attribute of a virtual TE link connecting two border nodes of a domain. The virtual link is supported by one or more underlay LSP(s) (e.g. of such underlay LSP(s) may be setup using RSVP or Segment-Routing Traffic Engineering). An express segment has attributes and properties like a physical link, such as a capacity, latency, etc. An express segment may include border node to border node links which may transit other nodes within a domain, such as IGP nodes. In segment routing, the "path" information for segments is disseminated between the routers within each of access network domains 114, metro network domains 118, and core network domain 120 as part of the IGP link state information for the respective domain. In accordance with this disclosure, the path information for at least express segments is disseminated or advertised between border nodes 116 using a BGP and/or to network controller 128 using a BGP link state (BGP-LS). Ingress node 112 is configured to steer a packet through an ordered list of instructions or segments by prepending one or more segment identifiers (SIDs) to the packet. In other words, ingress node 112 can steer a packet through a desired set of nodes and links by prepending the packet with an appropriate combination (stack) of SIDs based on a calculated path. Segment routing allows routers to enforce a flow through any topological path and service chain while maintaining per-flow state only at the ingress node to each domain.

Segment routing can be directly applied to the Multiprotocol Label Switching (MPLS) architecture with no change in the forwarding plane. A network administrator or centralized controller, e.g., network controller 128, need only allocate SIDs to particular routers and the segment routing control plane architecture automatically builds the required MPLS forwarding constructs from a router to any other router. A SID is encoded as an MPLS label, and an ordered list of SIDs is encoded as a stack of labels. The SID of the segment to be processed is on the top of the stack and, upon completion of a segment, the related label is popped from the stack as the packet is forwarded through the network.

Segment routing is further described in Filsfils, et al., "Segment Routing Architecture," IETF RFC 8402, July 2018, while Segment Routing use cases are described in Filsfils, et al., "Segment Routing Use Cases," IETF Internet-Draft draft-filsfils-spring-segment-routing-use-cases-01, Oct. 21, 2014, each of which is incorporated herein by reference. Further details regarding SPRING are found in (1) Filsfils, et al., "Segment Routing Policy Architecture," IETF Internet-Draft draft-ietf-spring-segment-routing-policy-06, Dec. 14, 2019; (2) Previdi, et al., "Source Packet Routing in Networking (SPRING) Problem Statement and Requirements," IETF RFC 7855, May 2016; and (3) Bashandy, et al., "Segment Routing with MPLS data plane," IETF RFC 8660, December 2019, each of which is incorporated herein by reference.

Further description of the establishment and use of prefix segments in interdomain network 190 is provided as an illustrative example. Each of nodes 116 may be associated with an address prefix. For instance, an administrator or network controller 128 may assign prefixes to one or more of border nodes 116. A prefix may be an address or block of addresses. The prefix corresponding to a node (e.g., a router) may comprise an Internet Protocol (IP) address (e.g., IPv4 or IPv6), a block of IP addresses, or another type of data identifying the node. Additionally, one or more of border nodes 116 may be configured with a segment identifier (SID) associated with the prefix. A router in interdomain network 190 may advertise its prefix and SID to neighboring routers within the same one of access network domains 114, metro network domains 118, and core network domain 120 of interdomain network 190. When a router receives an advertisement, the router may forward the advertisement to its neighboring routers. A router that merely forwards an advertisement is not considered to originate the advertisement. Additionally, when a router receives an advertisement, the router determines whether the prefix specified in the advertisement is already associated with the SID specified in the advertisement. If this is the case and if the advertisement represents a new best path, the router may update a routing table in response to the advertisement such that the routing table indicates a next hop in the route to the prefix. If the advertisement represents an equal cost compared to the existing route, the router may add an equal-cost multi-path (ECMP) next hop to the existing route.

If the advertisement specifies a prefix and a SID that are not already in the receiving router's LSDB or TED, the router may calculate a route to the prefix specified in the advertisement. In some examples, the router may calculate the route according to a shortest path algorithm or a strict shortest path algorithm. Furthermore, in some examples, an advertisement may specify the type of algorithm to use to calculate the route to the prefix specified in the advertisement. Additionally, the router may associate the SID specified by the advertisement with the calculated route to the prefix specified by the advertisement. In other words, the router may generate data that associates the SID with the route. The router may then install the route as an active route. Installing a route as an active route may comprise generating forwarding information that a forwarding component of the router may use to forward packets to next hops of routes associated with SIDS attached to the packets. For instance, installing the route as an active route may comprise generating information in a forwarding table that maps a SID to an interface card attached to a link to a next hop of the route associated with the SID.

As illustrated in FIG. 1, a network, such as interdomain network 190, may be partitioned into multiple IGP domains or areas, such as access network domains 114, metro network domains 118, and core network domain 120. In the example of FIG. 1, border nodes 116A, and 116B are in ingress access network domain 114A, border nodes 116B, 116C, 116D, and 116E are in metro network domain 118A, border nodes 116C, 116D, 116E, and 112F are in core network domain 120. Border nodes 116E-116I are in metro network domain 118F and border node 116J is in both access network domain 114F and egress access network domain 114G. Nodes in a given domain typically do not store data describing nodes and routes within other domains, including prefixes and SIDS. For instance, a node in a first IGP domain does not typically store a LSDB or TED and corresponding prefixes and SIDs for any other IGP domain.

When an IGP advertisement originated by a router in ingress access network domain 114A reaches a border node that spans ingress access network domain 114A and metro network domain 118A, e.g., border node 116A or 116B, the node spanning the network domains may either drop the advertisement originated in ingress access network domain 114A or re-originate the advertisement in metro network domain 118A. For instance, in the example of FIG. 1, if border node 116B receives an IGP advertisement originated by ingress node 112 in ingress access network domain 114A, border node 116B may not forward the advertisement to border node 116C in metro network domain 118A.

After installing a route as an active route, a router may receive a packet. In response to receiving the packet, the router may determine whether a stack of one or more labels is attached to the packet. The stack of labels comprises an ordered sequence of labels. If there is no stack of labels attached to the packet when the router receives the packet or if there are no remaining labels attached to the packet after the router removes the active label, the router forwards the packet to another node in interdomain network 190 without further use of segment routing. For instance, the router may forward the packet according to an IP address of the packet.

However, if the stack of labels still includes one or more labels, the router may determine a next hop of a route associated with the active label of the stack. The active label may be the label at the "top" of the stack. For instance, the active label may be the label occurring first in an ordered sequence of labels attached to the packet. If the next hop of the route associated with the active label advertised the active SID, the router may remove the active label from the stack of labels attached to the packet, potentially leaving one or more labels remaining attached to the packet. In other words, the router may "pop" the active label from the stack. The router may then forward the packet, along with the remaining labels of the stack, to a next hop on the route associated with the active label. This system may allow a source node, such as ingress node 112, to control the path a packet takes through interdomain network 190.

Ingress nodes of each one of access network domains 114 may build intradomain LSPs, e.g., using label distribution protocol (LDP) or resource reservation protocol with traffic engineering extensions (RSVP-TE), or intradomain segment routing (SR) tunnels within the respective domain. The ingress nodes may then provision binding segments that represent the intradomain tunnels and assign binding SIDs (BSIDs) to the binding segments. The BSIDs can be attached to a virtual TE link and advertised as an express-segment. Traditionally, an interdomain segment routing tunnel is constructed by using a list of BSIDs of intradomain tunnels, essentially stitching together a sequence of intradomain tunnels. For example, an interdomain segment routing tunnel across N domains may be achieved by using a BSID list comprising SID_1, SID_2, . . . SID_N, where SID_X is the BSID of an intradomain tunnel across domain X.

For example, ingress node 112 may receive network layer reachability information (NLRI) (for subscriber device 184) via multiprotocol BGP (MP-BGP) may obtain reachability information for subscriber device 184. For example, ingress node 112 may receive information regarding egress node 122 via BGP-next hop (NH): egress node 122. In some examples, via on demand next-hop (ODN), ingress node 112 or network controller 128 may compute path to egress provider edge (PE): egress node 122.

In the example of FIG. 1, access network domains 114B-114E and metro network domains 118B-118E do not provide a path from ingress node 112 to egress node 122. Therefore, access network domains 114B-114E and metro network domains 118B-118E may be excluded from the subset of domains to be considered when computing the interdomain path from ingress node 112 to egress node 122 (e.g., excluded from filtered TED).

There may be a limit to the computation power of a node. In some examples, a network element may group certain nodes into one domain in a multidomain network. BGP may be used in a multidomain network to pick the shortest hop. For example, ingress node 112 wants to reach egress node 122. A PCE of network controller 128 may compute one or more interdomain paths from ingress node 112 to egress node 122.

Figure 2:
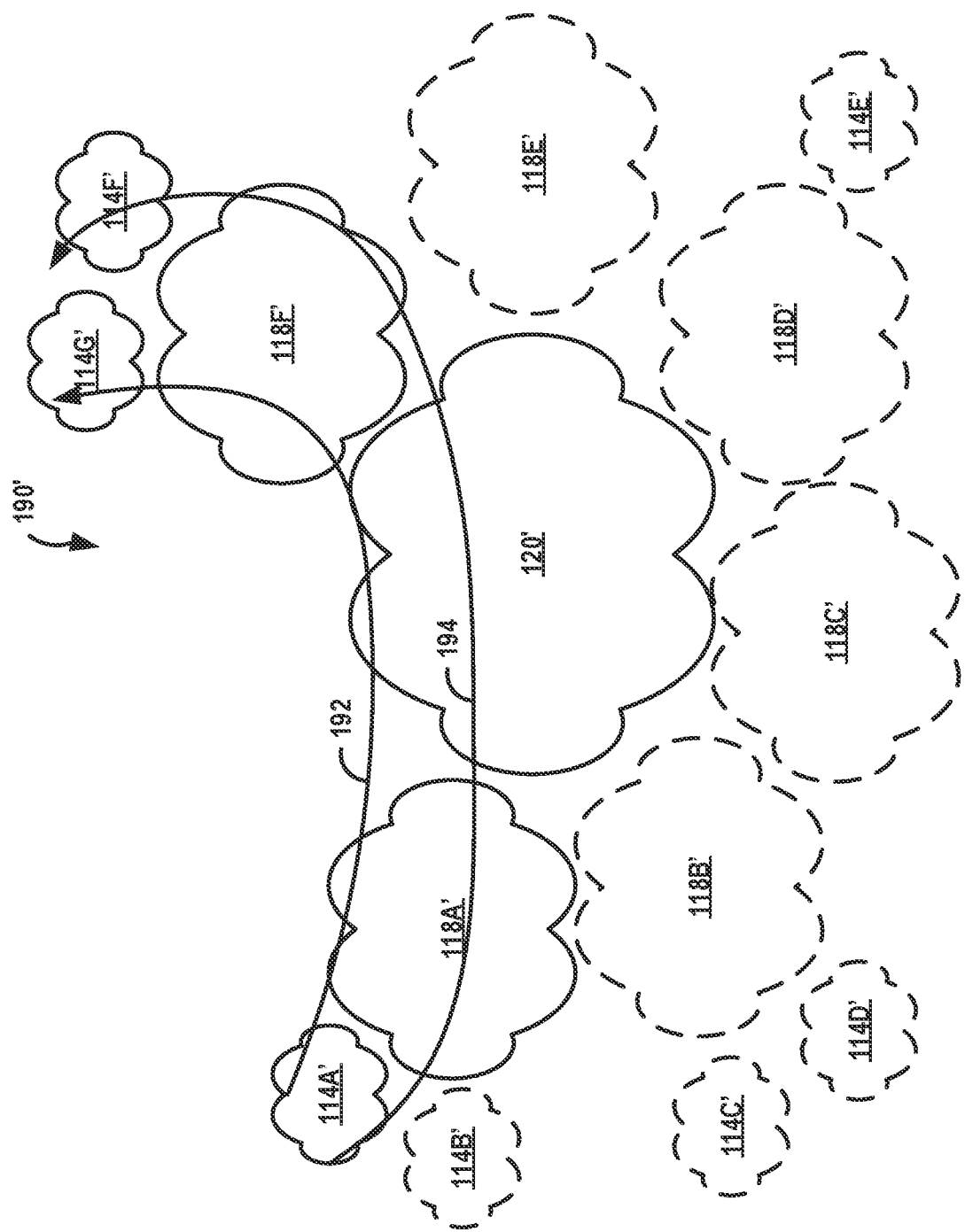
FIG. 2 is a block diagram illustrating an example of an abstracted interdomain topology in accordance with techniques of this disclosure.

FIG. 2 is a block diagram illustrating an example of an abstracted interdomain topology in accordance with techniques of this disclosure. For example, BGP-LS extensions may be advertised by egress node 122 (of FIG. 1) such that network controller 128 (of FIG. 1) knows that egress node 122 is in egress access network domain 114G. Network controller 128 may leverage domain ID advertisement for abstraction and filtering. For example, network controller 128 may determine an egress network domain ID of an egress network domain. Based on the egress network domain ID, network controller 128 may determine an abstracted interdomain network topology 190'. For example, network controller 128 may know the ingress network domain ID and the egress network domain ID and may abstract a single virtual node of each domain that may be part of one or more interdomain paths from ingress node 112 (of FIG. 1) to egress node 122. In this manner, network controller 128 may not see interior nodes, such as the IGP nodes represented by the dots in FIG. 1. For example, network controller 128 may abstract all nodes in ingress access network domain 114A to an abstracted ingress domain node 114A'. Network controller 128 may abstract all nodes in metro network domain 118A to an abstracted node 118A'. Network controller 128 may abstract all nodes in core network domain 120 to an abstracted node 120'. Network controller 128 may abstract all nodes in metro network domain 118F to an abstracted node 118F'. Network controller 128 may abstract all nodes in access network domain 114F to an abstracted node 114F' and all nodes in egress access network domain 114G to an abstracted node 114G'.

For example, a network element, such as network controller 128, may use an LSDB to derive the egress domain ID from egress node 122. In some examples, network controller 128 may determine an abstracted interdomain network topology 190', wherein each domain is treated as an abstract node and these domains are connected via abstract links. Network controller 128 determine one or more interdomain paths from abstracted ingress domain node 114A' to abstracted egress domain node 114G'. For example, network controller 128 may use a k-shortest path algorithm to determine a number k of shortest interdomain paths from abstracted ingress domain node 114A' to abstracted egress domain node 114G' based on the abstracted interdomain network topology 190' via the abstracted domain nodes. In some examples, a user, such as a network operator, determines the value of k. In some examples, every domain across the entire network may each be abstracted into their own abstracted domain node. For example, in addition to the abstracted domain nodes mentioned above, network controller 128 may abstract each of access network domains 114B-114E into a respective abstracted domain node 114B'-114E' and network controller 128 may abstract each of metro network domains 118B-118E to a respective abstracted metro domain node 118B'-118E'.

Network controller 128 may use each of the one or more interdomain paths (e.g., interdomain path 192 or interdomain path 194) to filter the links and/or nodes in the LS table that are along the one or more interdomain paths and decorate them with a respective route-target (RT). For example, link state network layer reachability information (NRLI) may carry RT(s).

The RT(s) may be further used to filter a link to determine a customized topology. Provider edge network elements (PEs) that are interested in a specific TED may import links/nodes carrying the specific RT. Network controller 128 may disregard network domains that correspond to abstracted domain nodes that are not along one or more of the interdomain paths between abstracted ingress domain node 114A' and abstracted egress domain node 114G'. For example, in FIG. 2, abstracted access domain nodes 114B'-114E' and abstracted metro domain nodes 118B'-118E' are not along interdomain path 192 or interdomain path 194 and are shown in dashed lines to so indicate. Therefore, network controller 128 may disregard or filter any of the resources within the network domains associated with abstracted access domain nodes 114B'-114E' and abstracted metro domain nodes 118B'-118E', thereby reducing the calculation of one or more paths to only the relevant resources (e.g., the resources in network domains associated with abstracted domain nodes on the one or more interdomain paths) from the filtered TED. As used herein, "filter" may mean not import, not copy into, filter out, eliminate, remove, delete, or otherwise not make or not keep present in the filtered TED. Such network domains that are along the one or more interdomain paths between ingress node 112 and egress node 122 may be included in the filtered TED. As used herein to "include" may mean to import, copy into, not filter out, or otherwise make or keep present in the filtered TED. Any link or node in any network domain not eventually connected to a network domain along the one or more interdomain paths may also be filtered from the filtered TED. In some examples, filtered TEDs may include a topology instantiated per ingress domain and egress domain pair or a topology instantiated per ingress domain, egress domain and VPN presence.

Network controller 128 may use the abstracted interdomain topology to determine which abstracted domain nodes are on the one or more interdomain paths and thereby determine which network domains have resources that should be in the filtered TED. For example, a filtered TED for path computation between abstracted ingress domain node 114A' and abstracted egress domain node 114G' may have [source domain=abstracted ingress domain node 114A', destination domain=abstracted egress domain node 114G']. The interdomain paths determined between abstracted ingress domain node 114A' and abstracted egress domain node 114G' may include: interdomain path 192: {abstracted ingress domain node 114A', abstracted metro domain node 118A', abstracted core domain node 120', abstracted metro domain node 118F', abstracted egress domain node 114G'}; and interdomain path 194: {abstracted ingress domain node 114A', abstracted metro domain node 118A', abstracted core domain node 120', abstracted metro domain node 118F', abstracted access domain node 114F', abstracted egress domain node 114G'}.

Figure 3:
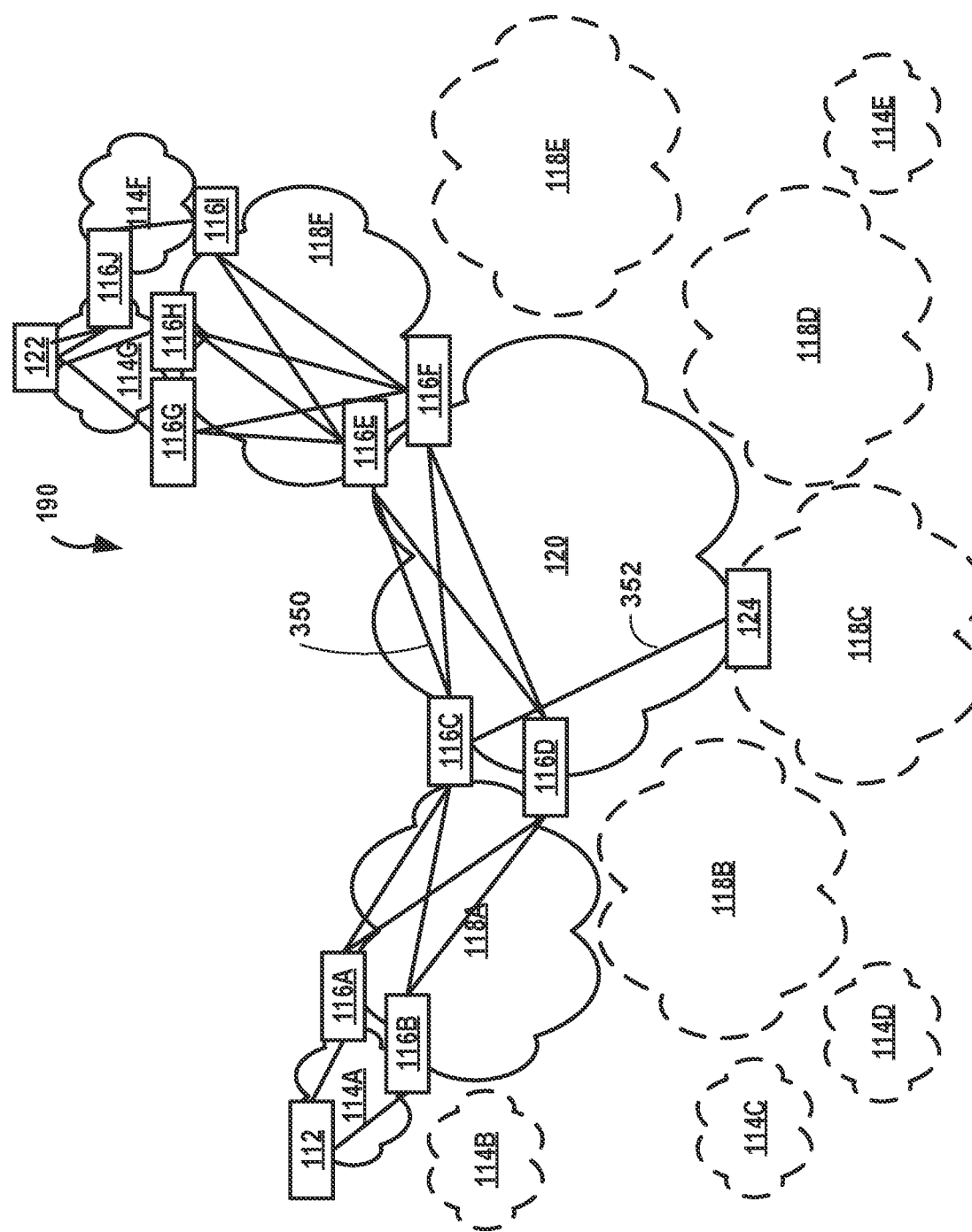
FIG. 3 is a block diagram illustrating an example of express segments between border nodes in accordance with the techniques of this disclosure.

FIG. 3 is a block diagram illustrating an example of express segments between border nodes in accordance with the techniques of this disclosure. In some examples, border nodes, such as any of border nodes 116 may be associated with at least one express segment. An express segment is a virtual link from one border node to another border node. An express segment has attributes and properties like a physical link, such as a capacity, latency, etc. An express segment may include border node to border node links which may transit other nodes within a domain, such as IGP nodes. For example, express segment 350 from border node 116C to border node 116E may include any links through any nodes (not shown for simplicity purposes) which may provide a path from border node 116C to border node 116E. In some examples, network controller 128 may use express segments to further reduce the links and/or nodes included in the filtered TED.

For example, when border nodes, such as border nodes 116 are connected by express segments, network controller 128 may inspect specific express segments to determine if the specific express segments are along the one or more interdomain paths between ingress access network domain 114A and egress access network domain 114G. When determining the filtered TED, network controller 128 may exclude any express segments that are not along the path from ingress node 112 to egress node 122. Express segments along the path from ingress node 112 to egress node 122 may be included in the filtered TED. Network controller 128 may include an express segment, such as express segment 350, in the filtered TED as a link. In some examples, the filtered TED may not include any IGP links within an express segment. In some examples, the filtered TED may only include express segments and not include any IGP links, as is represented by the depicted links of FIG. 3 where each of ingress node 112, egress node 122 and border nodes 116 include express segments to other depicted nodes in their respective network domain.

In some examples, network controller 128 may determine whether a first border node (e.g., border node 116C) associated with the first network domain (e.g., core network domain 120) is associated with at least one express segment. Based on the first border node supporting express segments, network controller 128 may include one or more express segments of the at least one express segment (e.g., express segment 350) within the first network domain in the filtered TED. In some examples, network controller 128 may determine whether a first express segment (e.g., express segment 350) within the first network domain is on the one or more interdomain paths (e.g., interdomain path 192 or interdomain path 194) and based on the first express segment being on the one or more interdomain paths, include the first express segment into the filtered TED. In another example, network controller 128 may determine whether a second express segment (e.g., express segment 352) within the first network domain is on the one or more interdomain paths (e.g., interdomain path 192 or interdomain path 194). Based on the second express segment not being on the one or more interdomain paths, network controller 128 may filter out the second express segment from the filtered TED. For example, an express segment may be along an interdomain path if both of the express segment's border nodes belong to or are associated with network domains along the interdomain path. An express segment may not be along an interdomain path if at least one of the express segment's border nodes do not belong to or are not associated with network domains along the interdomain path. For example, express segment 352 connects border node 116C to border node 124. But border node 124 is in core network domain 120 and metro network domain 118C, which is not along either interdomain path 192 or interdomain path 194. Therefore, network controller 128 may filter express segment 352 from the filtered TED. As such, network controller 128 may filter the express segments such that only express segments on the one or more interdomain paths may be considered during the path computation.

In some examples, network controller 128 may determine a topology-based filtered TED for each egress domain. Network controller 128 may include border nodes that are along the one or more computed interdomain paths in the filtered TED. For example, the filtered TED may include border nodes 116, as each of these border nodes is along the path between ingress node 112 and egress node 122. This filtered TED may include links egressing from included nodes and/or terminating on included border nodes. For example, border nodes 116G and 116H may advertise both egress access network domain 114G and metro network domain 118F. Network controller 128 may create a new instance of TED (e.g., a filtered TED) that is dependent on the ingress domain (e.g., ingress access network domain 114A) and the egress domain (e.g., access network domain 114G). Network controller 128 may eliminate links to any node not eventually linked to the ingress domain or egress domain.

Figure 4:
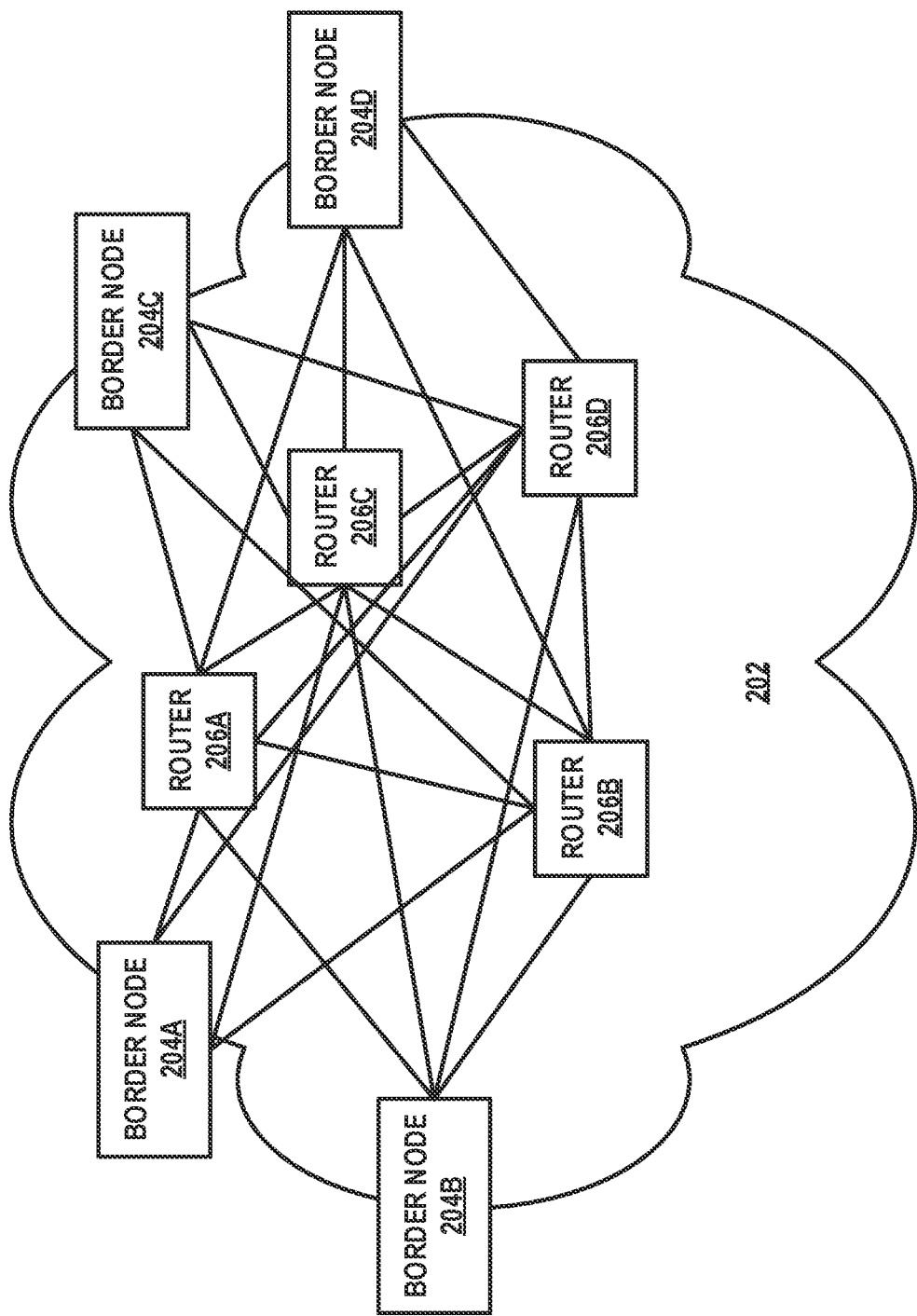
FIG. 4 is a block diagram of an example network domain not supporting express segments in accordance with techniques of this disclosure.

FIG. 4 is a block diagram of an example network domain not supporting express segments in accordance with the techniques of this disclosure. Network domain 202 may be an example of any of access network domains 114, metro network domains 118, or core network domain 120. As can be seen in FIG. 4, each of border nodes 204A-204D (collectively border nodes 204) has a link to each of routers 206A-206D (collectively routers 206) which may be IGP routers. Similarly, each of routers 206 has a link to each of the other routers 206. In this example, network domain 202 does not support express segments. For example, there are no virtual links shown directly between one of border nodes 204 and another of border nodes 204. If border nodes of a network domain are not associated with any express segments, network controller 128 may include in the filtered TED actual links and/or nodes within that domain. Thus, in this example, the filtered TED may have each of the illustrated links of FIG. 4, border nodes 204, and routers 206. In some examples, the filtered TED may include a list of express segments from border nodes of network domains along the one or more interdomain paths from ingress node 112 to egress node 122 supporting express segments and a list of any IGP links and/or nodes from network domains along the one or more interdomain paths from ingress node 112 to egress node 122 that do not support express segments.

For each domain along the interdomain path, network controller 128 may inspect each border node in those domains. For example, network controller 128 may inspect each of border nodes 116. When a border node is an area border router (ABR), the border node resides between (at least) 2 domains. For example, border nodes 116A and 116B reside between ingress access network domain 114A and metro network domain 118A. If the border node belongs to domains along the interdomain computed path, then network controller 128 may include the node into the filtered TED. In some examples, only express segments connecting imported border nodes may be included in the filtered TED. If a domain does not have or support express segments, then network controller 128 may include all IGP links of the domain in the filtered TED.

Figure 5:
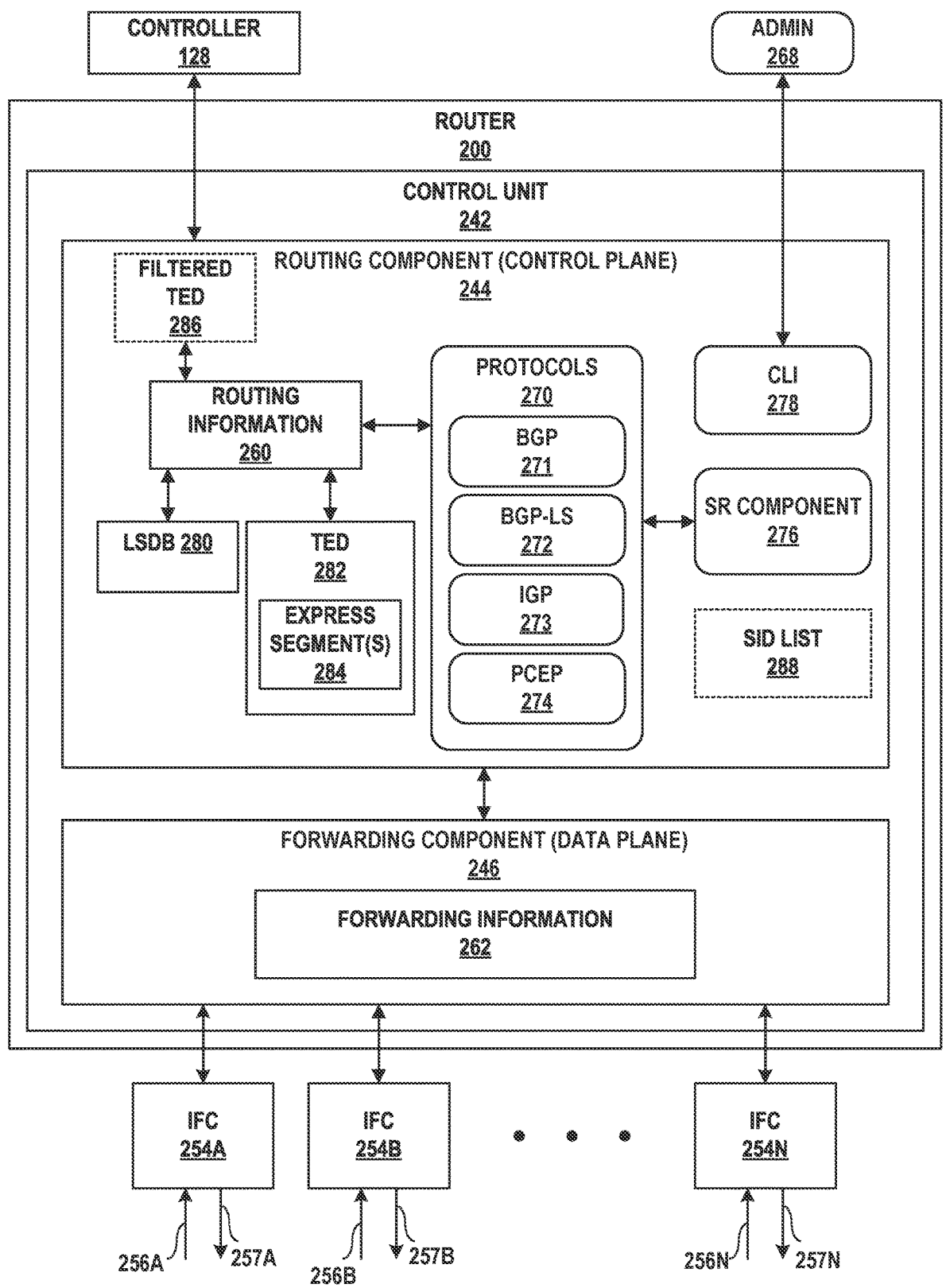
FIG. 5 is a block diagram illustrating an example network element capable of operating in accordance with the techniques of this disclosure.

FIG. 5 is a block diagram illustrating an example network element capable of operating in accordance with the techniques described herein. Router 200 may represent an example of ingress node 112 or any of border routers 116 of FIG. 1. Thus, while described with respect to ingress node 112, the techniques should not be limited to ingress node 112 as described with respect to the example of FIG. 5.

In the example of FIG. 5, router 200 includes interface cards 254A-254N ("IFCs 254") that receive and send data units, such as packet flows, via network links 256A-256N and 257A-257N, respectively. Router 200 may include a chassis (not shown) having a number of slots for receiving a set of cards, including IFCs 254. Each card may be inserted into a corresponding slot of the chassis for electrically coupling the card to routing component 244 via high-speed switch (not shown), which may comprise, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 200 may interface with links of a network.

In general, router 200 may include a control unit 242 that determines routes of received packets and forwards the packets accordingly via IFCs 254. In the example of FIG. 5, control unit 242 includes routing component (control plane) 244 that configures and controls packet forwarding operations applied by forwarding component (data plane) 246.

Routing component 244 provides an operating environment for various routing protocols 270 that execute at different layers of a network stack. Routing component 244 is responsible for the maintenance of routing information 260 to reflect the current topology of a network and other network entities to which router 200 is connected. In particular, routing protocols periodically update routing information 260 to accurately reflect the topology of the network and other entities based on routing protocol messages received by router 200. The protocols may be software processes executing on one or more processors. For example, routing component 244 includes network protocols that operate at a network layer of the network stack, which are typically implemented as executable software instructions.

In the example of FIG. 5, protocols 270 may include Border Gateway Protocol (BGP) 271 to exchange routing and reachability information among routing domains in a network and BGP-LS 272 to exchange traffic engineering and segment routing policy information among routing domains in the network. The BGP-LS protocol is described in additional detail in H. Gredler, et al., "North-Bound Distribution of Link-State and Traffic Engineering (TE) Information using BGP," Internet Engineering Task Force (IETF) RFC 7752, March 2016, the entire contents of which are incorporated herein by reference.

Protocols 270 may also include IGP 273 to exchange link state information, and facilitate forwarding of packets or other data units between routers within each of the routing domains. In some examples, IGP 273 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and RFC 8362, by A. Lindem et al., entitled "OSPFv3 Link State Advertisement (LSA) Extendibility," dated April 2018. In some examples, IGP 273 may include an IS-IS routing protocol that implements an IGP for exchanging routing and reachability information within a routing domain in accordance with RFC 1142, by D. Oran, entitled "OSI IS-IS Intradomain Routing Protocol," dated February 1990 (republication of ISO/IEC 10589, last updated November 2002). IGP 273 may include IS-IS extensions that support traffic engineering, as described in RFC 5305, by T. Li et al., entitled "IS-IS Extensions for Traffic Engineering," dated October 2008. In some examples, router 200 may include both an OSPF component and an IS-IS component.

Protocols 270 may also include configuration protocols. For example, protocols 270 may include PCEP 274 in accordance with RFC 5440, by J P. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011. In some examples where router 200 comprises ingress node 112, network controller 128 (from FIG. 1 and FIG. 3) may configure router 200 with SID list 288 for a segment routing tunnel via PCEP 274 or a NETCONF component (not shown). Protocols 270 may include other routing protocols (not shown), such as Label Distribution Protocol (LDP), Resource Reservation Protocol with Traffic Extensions (RSVP-TE), routing information protocol (RIP), or other network protocols.

Routing component 244 includes a segment routing (SR) component 276 to implement segment routing techniques that specify how router 200 may provision and advertise SIDs for adjacency segments, prefix segments, binding segments or, in accordance with this disclosure, express segments. An ingress node, such as ingress node 112 of FIG.

1, may use the SIDs to steer a packet through a controlled set of instructions, called segments, by prepending the packet with a SID label stack in a segment routing header.

By executing the routing protocols, routing component 244 identifies existing routes through the network and determines new routes through the network. Routing component 244 stores routing information 260 that includes, for example, known routes through the network. Forwarding component 246 stores forwarding information 262 that includes destinations of output links 257. Forwarding information 262 may be generated in accordance with routing information 260.

Routing component 244 includes a link state database (LSDB) 280 for storing domain topology information including SIDS and labels for provisioned segments, e.g., adjacency segments, prefix segments, and binding segments, within the routing domain of router 200. Routing component 244 further includes a Traffic Engineering Database (TED) 282 that augments LSDB 280 with TE link attributes. Each of LSDB 280 and TED 282 may be in the form of a variety of data structures, such as a number of tables, link lists, radix trees, databases, flat files, or other data structures.

In some examples, router 200 may be an example of ingress node 112 that may send LSDB and/or TED information to network controller 128 via BGP-LS. Network controller 128 may use such information to generate a filtered TED and determine a path from ingress node 112 to egress node 122. Network controller 128 may send the path information to ingress node 112 via PCEP.

For example, network controller 128 may determine an egress network domain ID of egress network domain 114G. Based on the egress network domain ID, network controller 128 may determine an abstracted interdomain network topology. The abstracted interdomain network topology may include abstracted ingress domain node 114A', abstracted egress domain node 114G', and an abstracted first domain node (e.g., abstracted core domain node 120'). Abstracted ingress domain node 114A' includes an abstraction of all nodes within ingress access network domain 114A. Abstracted egress domain node 114G' includes an abstraction of all nodes within egress network domain 114G. The abstracted first domain node (e.g., abstracted core domain node 120') comprises an abstraction of all nodes within a first network domain (e.g., core network domain 120). Network controller 128 may determine one or more interdomain paths (e.g., interdomain path 192 and/or interdomain path 194) from abstracted ingress domain node 114A' to the abstracted egress domain node 114G'.

Network controller 128 may determine whether the abstracted first domain node (e.g., abstracted core domain node 120') is on the one or more interdomain paths (e.g., interdomain path 192 and/or interdomain path 194). Based on the abstracted first domain node being on the one or more interdomain paths, or network controller 128 may include one or more resources within the first network domain in filtered TED 286. Network controller 128 may compute a path from ingress node 112 within ingress network domain 114A to egress node 122 within egress network domain 114G based on filtered TED 286.

LSDB 280 may store express segment(s) 284 for router 200. For example, LSDB 280 may store virtual links between router 200 (when router 200 is an example of a border node) and another border node in the same network domain In some examples, router 200 may comprise an ingress node that may be configured to compute an interdomain path. For example, rather than send LSDB and/or TED information to network controller 128 for path computation, router 200 may compute the path. In such examples, router 200 may include filtered TED 286 (shown in dashed lines), which may include abstracted domain nodes, express segments, and/or IGP links and/or nodes according to the techniques of this disclosure. In examples where router 200 comprises an ingress node of an interdomain segment routing tunnel, routing component 244 may further include a SID list 288 for the interdomain segment routing tunnel. In some examples, network controller 128 may provision the interdomain segment routing tunnel and program router 200, as the ingress node, with SID list 288 for the interdomain segment routing tunnel via PCEP 274.

Regardless of how the interdomain segment routing tunnel is provisioned, routing component 244 stores SID list 288 for the interdomain segment routing tunnel. Based on SID list 288, routing component 244 creates a segment routing label stack for the interdomain segment routing tunnel. Upon receipt of packets destined for the egress node of the interdomain segment routing tunnel, forwarding component 246 appends the segment routing stack onto the packets and forwards the packets in accordance with the segment routing label stack.

Although described for purposes of example with respect to a router, router 200 may be more generally a network device having routing functionality, and need not necessarily be a dedicated routing device. The architecture of router 200 illustrated in FIG. 5 is shown for example purposes only. The techniques of this disclosure are not limited to this architecture. In other examples, router 200 may be configured in a variety of ways. In one example, some of the functionally of control unit 242 may be distributed within IFCs 254. In another example, control unit 242 may comprise a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may comprise executable instructions stored on a computer-readable storage medium, such as computer memory or hard disk.

Figure 6:
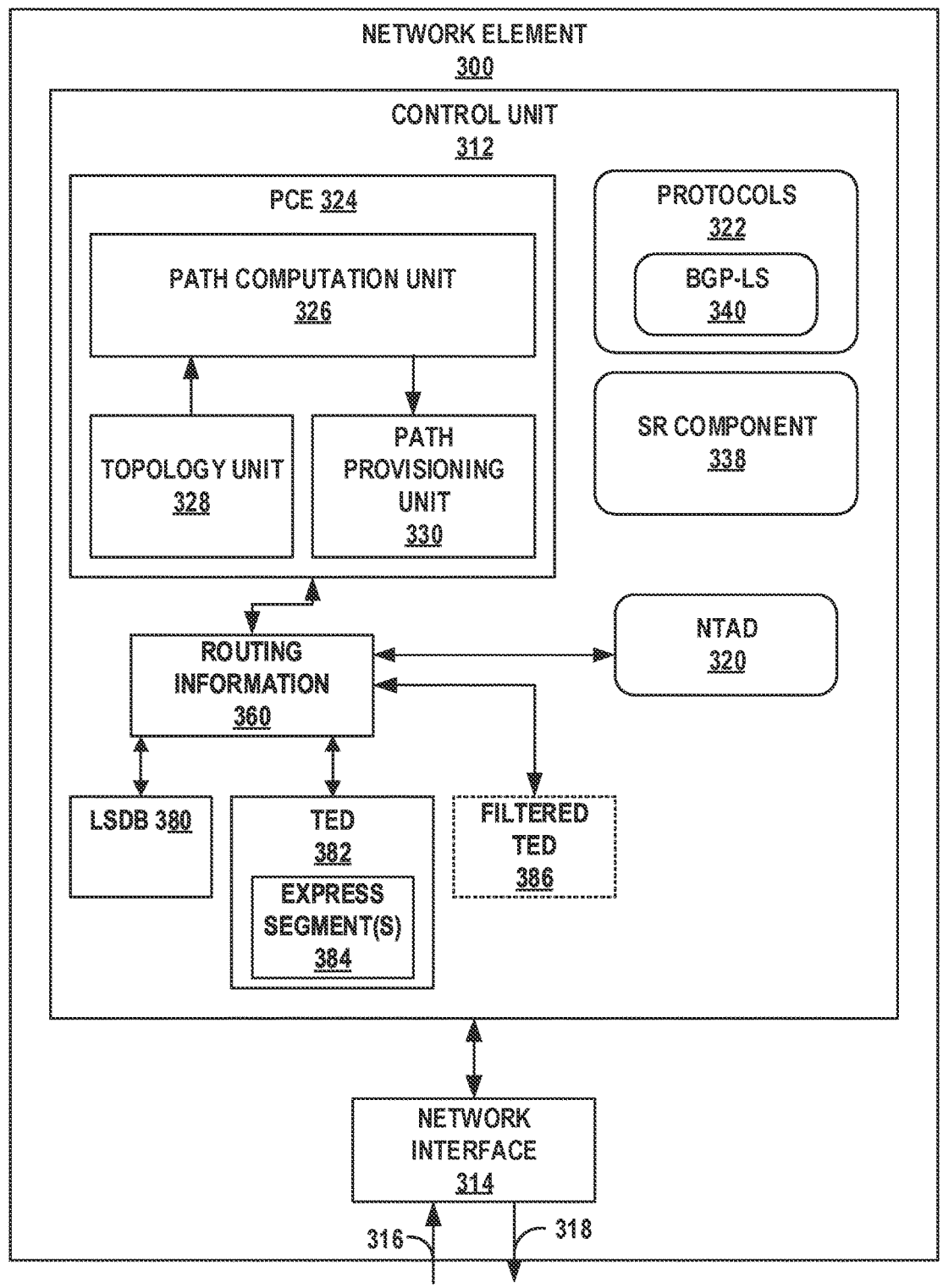
FIG. 6 is a block diagram illustrating another example network element capable of operating in accordance with the techniques of this disclosure.

FIG. 6 is a block diagram illustrating an example network element capable of operating in accordance with the techniques of this disclosure. Network element 300 may be an example of controller 128 of FIG. 1. The architecture of network element 300 illustrated in FIG. 6 is shown for example purposes only and should not be limited to this architecture. In other examples, network element 300 may be configured in a variety of ways.

Network element 300 may include a control unit 312 coupled to a network interface 314 to exchange packets with other network devices by inbound link 316 and outbound link 318. Control unit 312 may include one or more processors (not shown) that execute software instructions, such as those used to define a software or computer program, stored to a computer-readable storage medium (not shown). Alternatively, or additionally, control unit 312 may comprise dedicated hardware for performing the techniques described herein.

Control unit 312 provides an operating environment for network topology abstractor daemon (NTAD) 320, path computation element (PCE) 324, and segment routing (SR) component 338. In one example, these units may be implemented as one or more processes executing on one or more virtual machines of one or more servers. That is, while generally illustrated and described as executing on a single network element 300, aspects of these units may be delegated to other computing devices. Control unit 312 also provides an operating environment for several protocols 322, including BGP-LS 340.

Control unit 312 may use BGP-LS 340 to receive link state information from border nodes within one or more domains of a computer network, e.g., border nodes 116 in access network domains 114, metro network domains 118, or core network domain 120 of network 100 from FIG. 1. Control unit 312 may also forward the received link state information to NTAD 320. NTAD 320 may generate a network topology based on the received link state information. In some examples, control unit may include routing information 360, LSDB 380 which may include express segments 384, TED 382, and/or filtered TED 386. LSDB 380 may store domain topology information including SIDs and labels for provisioned segments, e.g., express segments, adjacency segments, prefix segments, and binding segments, within interdomain network 190. TED 382 may augment LSDB 380 with TE link attributes. Each of LSDB 280 and TED 282 may be in the form of a variety of data structures, such as a number of tables, link lists, radix trees, databases, flat files, or other data structures. Filtered TED 386 may include network domains, abstracted domain nodes, express segments, nodes, and/or links according to the techniques of this disclosure.

As illustrated in FIG. 6, PCE 324 includes a path computation unit 326, a topology unit 328, and a path provisioning unit 330. NTAD 320 may forward the topology data to topology unit 328 of PCE 324. Topology unit 328 may receive the topology data describing available resources of the computer network, including access, aggregation, and edge nodes, interfaces thereof, and interconnecting communication links. Path computation unit 326 of PCE 324 may use the topology data received by topology unit 328 to compute paths across the computer network. For example, NTAD 320 may determine an egress network domain ID of egress network domain 114G. Based on the egress network domain ID, NTAD 320 may determine an abstracted interdomain network topology. The abstracted interdomain network topology may include abstracted ingress domain node 114A', abstracted egress domain node 114G', and an abstracted first domain node (e.g., abstracted core domain node 120'). Abstracted ingress domain node 114A' includes an abstraction of all nodes within ingress network domain 114A. Abstracted egress domain node 1145G' includes an abstraction of all nodes within egress network domain 114G. The abstracted first domain node (e.g., abstracted core domain node 120') includes an abstraction of all nodes within a first network domain (e.g., core network domain 120). Path computation unit 326 may determine one or more interdomain paths (e.g., interdomain path 192 and/or interdomain path 194) from abstracted ingress domain node 114A' to the abstracted egress domain node 114G'.

Path computation unit 326 may determine whether the abstracted first domain node (e.g., abstracted core domain node 120') is on the one or more interdomain paths (e.g., interdomain path 192 and/or interdomain path 194). Based on the abstracted first domain node being on the one or more interdomain paths, path computation unit 326 may include one or more resources within the first network domain in filtered TED 386. Path computation unit 326 may compute a path from ingress node 112 within ingress network domain 114A to egress node 122 within egress network domain 114G based on filtered TED 286. Upon computing the path, path computation unit 326 may schedule the path for provisioning by path provisioning unit 330. A computed path includes path information usable by path provisioning unit 330 to establish the path in the network. For example, path provisioning unit 330 may send the path information to network devices to instruct the network devices to establish at least a portion of the path in the network. Provisioning a path may require path validation prior to committing the path to provide for packet transport.

Routing component 244 includes a link state database (LSDB) 280 for storing domain topology information including SIDs and labels for provisioned segments, e.g., adjacency segments, prefix segments, and binding segments, within the routing domain of router 200. Routing component 244 further includes a Traffic Engineering Database (TED) 282 that augments LSDB 280 with TE link attributes. Each of LSDB 280 and TED 282 may be in the form of a variety of data structures, such as a number of tables, link lists, radix trees, databases, flat files, or other data structures.

Figure 7:
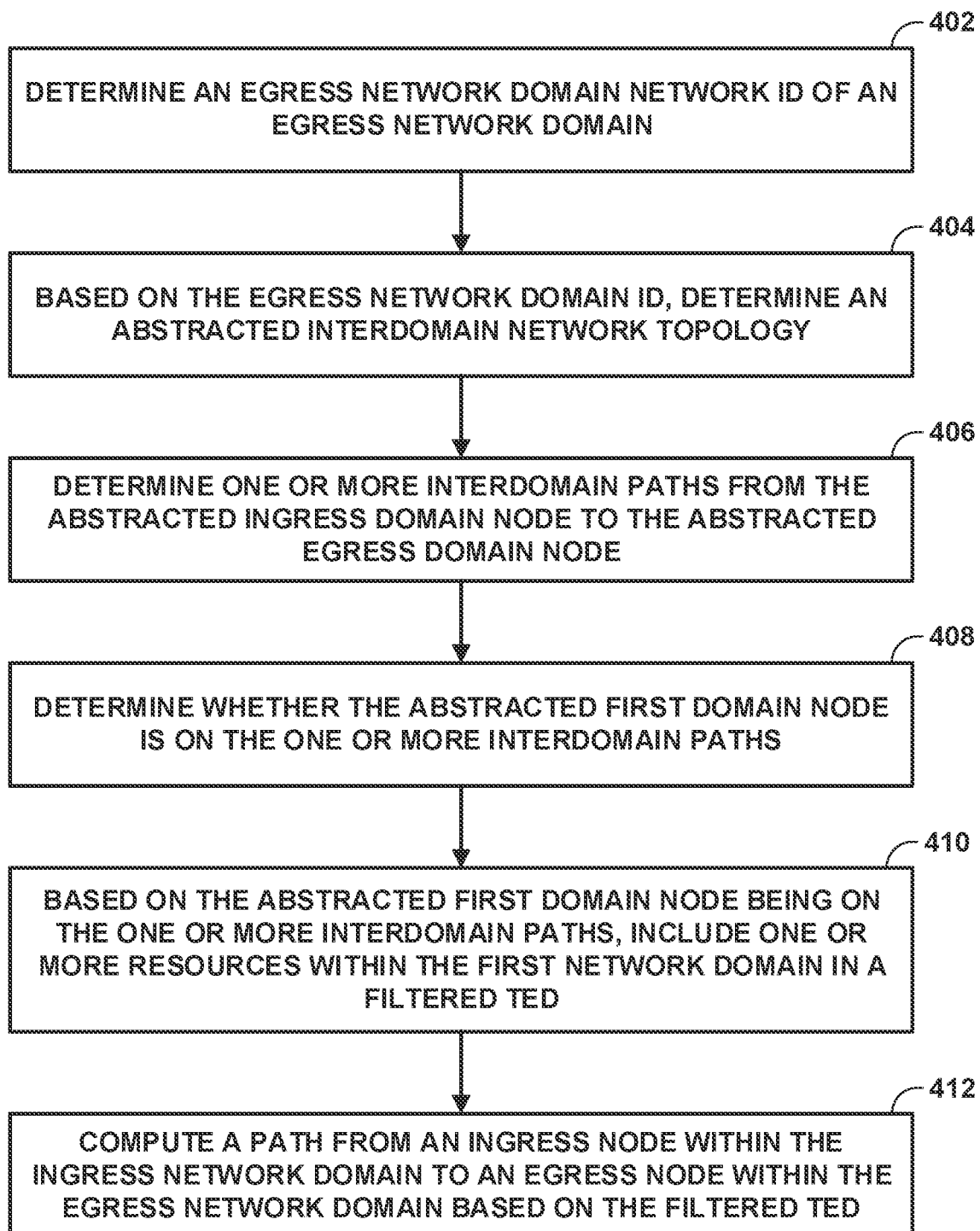
FIG. 7 is a flowchart illustrating an example operation of a network element computing an interdomain path in accordance with the techniques of this disclosure.

FIG. 7 is a flowchart illustrating an example operation of a network element computing an interdomain path in accordance with the techniques of this disclosure. One or more processors of control unit 312 may determine an egress network domain ID of egress network domain 114G (402). For example, control unit 312 may read the egress network domain ID of egress network domain 114G that includes egress node 122 from a link state database. Based on the egress network domain ID, control unit 312 may determine an abstracted interdomain network topology (404). For example, control unit 312 may determine the abstracted interdomain network topology to include an abstracted ingress domain node 114A', an abstracted egress domain node 114G', and an abstracted first domain node (e.g., abstracted core domain node 120'). The control unit 312 may determine abstracted ingress domain node 114A' to include an abstraction of all nodes within an ingress network domain 114A. Control unit 312 may determine the abstracted egress domain node 114G' to include an abstraction of all nodes within an egress network domain 114G. The one or more processors of control unit 312 may determine the abstracted first domain node (e.g., abstracted core domain node 120') to include an abstraction of all nodes within a first network domain (e.g., core network domain 120).

Control unit 312 may determine one or more interdomain paths from the abstracted ingress domain node to the abstracted egress domain node (406). For example, Control unit 312 may determine network domain IDs for each network domain (e.g., metro network domain 118A, core network domain 120, metro network domain 118F, and access network domain 114F) on one or more paths from abstracted ingress domain node 114A' to abstracted egress domain node 114G'. For example, control unit 312 may employ a k-means algorithm to determine up to k paths from abstracted ingress domain node 114A' to abstracted egress domain node 114G'.

Control unit 312 may determine whether the abstracted first domain node is on the one or more interdomain paths (408). For example, control unit 312 may determine whether a first network domain ID associated with the abstracted first domain node (e.g., abstracted core network domain node 120') is on interdomain path 192 or interdomain path 194.

Based on the abstracted first domain node being on the one or more interdomain paths, control unit 312 may include one or more resources within the first network domain in a filtered TED (410). For example, control unit 312 may add or may keep (e.g., not filter out) at least one link or node from the first network domain (e.g., core network domain 120) in the filtered TED. Control unit 312 may compute a path from an ingress node within the ingress network domain to an egress node within the egress network domain based on the filtered TED (412). For example, control unit 312 may use filtered TED 386 rather than TED 382 to compute the path from ingress node 112 to egress node 118.

In some examples, the abstracted interdomain network topology further includes an abstracted second domain node (e.g., abstracted metro domain node 118B'). The abstracted second domain node may include an abstraction of all nodes within a second network domain (e.g., metro network domain 118B). Control unit 312 may determine whether the abstracted second domain node is on the one or more interdomain paths (e.g., interdomain path 192 or interdomain path 194). Based on the abstracted second domain node not being on the one or more interdomain paths, the control unit 312 may filter out one or more resources within the second network domain (e.g., metro domain network 118B) from the filtered TED.

In some examples, control unit 312 may determine whether the abstracted first domain node meets a constraint and wherein including the one or more resources within the first network domain in filtered TED 386 is further based on the abstracted first domain node meeting the constraint. For example, the constraint may include whether a node is participating in a virtual private network, has a latency of a predetermined time or less, has a jitter of a predetermined amount or less, has a bandwidth of a predetermined amount or more, etc.

In some examples, control unit 312 may determine whether a first border node (e.g., border node 116A) associated with the first network domain (e.g., metro network domain 1118A) is associated with at least one express segment 284. Including the one or more resources within the first network domain in filtered TED 286 may include, based on the first border node being associated with express segments, control unit 312 may include one or more express segments of the at least one express segment 284 within the first network domain in filtered TED 286.

In some examples, including the one or more express segments within the first network domain in the filtered TED may include, control unit 312 determining whether a first express segment (e.g., express segment 350) established between the first border node (e.g., border node 116C) and a second border node (e.g., border node 116E) within the first network domain (e.g., core network domain 120) is on the one or more interdomain paths (e.g., interdomain path 192 or interdomain path 194) based on whether the first border node and the second border node are associated with other network domains having abstracted domain nodes on the one or more interdomain paths. Based on the first express segment (e.g., express segment 350) being on the one or more interdomain paths, control unit 312 may include the first express segment into filtered TED 286.

In some examples, control unit 312 is further configured to determine whether a second express segment (e.g., express segment 352) established between the first border node (e.g., border node 116C) and a third border node (e.g., border node 124) associated with the first network domain (e.g., core network domain 120) is on the one or more interdomain paths (e.g., interdomain path 192 or interdomain path 194) based on whether the first border node and the third border node are associated with other network domains having abstracted domain nodes on the one or more interdomain paths. Based on the second express segment (e.g. express segment 352) not being on the one or more interdomain paths, control unit 312 may filter out the second express segment from filtered TED 286.

In some examples, an abstracted interdomain network topology further includes an abstracted second domain node. The abstracted second domain node includes an abstraction of all nodes within a second network domain (e.g., network domain 202 of FIG. 4). Control unit 312 may determine whether the abstracted second domain node is on the one or more interdomain paths and based on the abstracted second domain node being on the one or more interdomain paths, control unit 312 may determine whether a second border node (border node 204A) associated with the second network domain is associated with at least one express segment and based on the second border node not being associated with at least one express segment, including one or more links and one or more nodes (e.g., border node 204A, router 206A, and border node 204C and the links therebetween) within the third network domain into filtered TED 286.

In some examples, the network element includes a router. In some examples, the network element includes a network controller. In some examples, the control unit includes a path computation element (PCE).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various aspects of the techniques have been described. These and other aspects are within the scope of the following claims.

What is claimed is:

1. A method comprising:
   determining an egress network domain identifier (ID) of an egress network domain;
   based on the egress network domain ID, determining an abstracted interdomain network topology, wherein the abstracted interdomain network topology comprises an abstracted ingress domain node, an abstracted egress domain node, and an abstracted first domain node, wherein the abstracted ingress domain node comprises an abstraction of a plurality of nodes within an ingress network domain, wherein the abstracted egress domain node comprises an abstraction of a plurality of nodes within the egress network domain, and wherein the abstracted first domain node comprises an abstraction of a plurality of nodes within a first network domain;
   determining one or more interdomain paths from the abstracted ingress domain node to the abstracted egress domain node;
   determining whether the abstracted first domain node is on the one or more interdomain paths;
   based on the abstracted first domain node not being on the one or more interdomain paths, filtering out one or more resources within the first network domain from a filtered traffic engineering database (TED); and
   computing a path from an ingress node within the ingress network domain to an egress node within the egress network domain based on the filtered TED.

2. The method of claim 1, wherein determining the egress network domain ID comprises reading the egress network domain ID of the egress network domain that includes the egress node from a link state database.

3. The method of claim 1, wherein the abstracted interdomain network topology further comprises an abstracted second domain node, the abstracted second domain node comprising an abstraction of a plurality of nodes within a second network domain, the method further comprising:
   determining whether the abstracted second domain node is on the one or more interdomain paths; and
   based on the abstracted second domain node being on the one or more interdomain paths, including one or more resources within the second network domain in the filtered TED.

4. The method of claim 3, further comprising:
   determining whether the abstracted second domain node meets a constraint,
   wherein including the one or more resources within the second network domain in the filtered TED is further based on the abstracted second domain node meeting the constraint.

5. The method of claim 3, further comprising:
   determining whether a first border node associated with the second network domain is associated with at least one express segment,
   wherein including the one or more resources within the second network domain in the filtered TED comprises, based on the first border node being associated with express segments, including one or more express segments of the at least one express segment within the second network domain in the filtered TED.

6. The method of claim 5, wherein including the one or more express segments within the second network domain in the TED comprises:
   determining whether a first express segment established between the first border node and a second border node associated with the second network domain is on the one or more interdomain paths based on whether the first border node and the second border node are associated with other network domains having abstracted domain nodes on the one or more interdomain paths; and
   based on the first express segment being on the one or more interdomain paths, including the first express segment into the filtered TED.

7. The method of claim 6, further comprising:
   determining whether a second express segment established between the first border node and a third border node associated with the second network domain is on the one or more interdomain paths based on whether the first border node and the third border node are associated with other network domains having abstracted domain nodes on the one or more interdomain paths; and
   based on the second express segment not being on the one or more interdomain paths, filtering out the second express segment from the filtered TED.

8. The method of claim 5, wherein the abstracted interdomain network topology further comprises an abstracted third domain node, and wherein the abstracted third domain node comprises an abstraction of a plurality of nodes within a third network domain, the method further comprising:
   determining whether the abstracted third domain node is on the one or more interdomain paths;
   based on the abstracted third domain node being on the one or more interdomain paths, determining whether a fourth border node associated with the third network domain is associated with one or more express segments; and
   based on the fourth border node not being associated with one or more express segments, including one or more links and one or more nodes within the third network domain into the filtered TED.

9. A network element comprising:
   one or more interfaces; and
   a control unit in communication with the one or more interfaces, the control unit comprising one or more processors configured to:
     determine an egress network domain identifier (ID) of an egress network domain;
     based on the egress network domain ID, determine an abstracted interdomain network topology, wherein the abstracted interdomain network topology comprises an abstracted ingress domain node, an abstracted egress domain node, and an abstracted first domain node, wherein the abstracted ingress domain node comprises an abstraction of a plurality of nodes within an ingress network domain, wherein the abstracted egress domain node comprises an abstraction of a plurality of nodes within the egress network domain, and wherein the abstracted first domain node comprises an abstraction of a plurality of nodes within a first network domain;
     determine one or more interdomain paths from the abstracted ingress domain node to the abstracted egress domain node;
     determine whether the abstracted first domain node is on the one or more interdomain paths;

based on the abstracted first domain node not being on the one or more interdomain paths, filter out one or more resources within the first network domain from a filtered traffic engineering database (TED); and compute a path from an ingress node within the ingress network domain to an egress node within the egress network domain based on the filtered TED.

10. The network element of claim 9, wherein the control unit is configured to determine the egress network domain ID by reading the egress network domain ID of the egress network domain that includes the egress node from a link state database.

11. The network element of claim 9, wherein the abstracted interdomain network topology further comprises an abstracted second domain node, the abstracted second domain node comprising an abstraction of a plurality of nodes within a second network domain, and wherein the control unit is further configured to:

determine whether the abstracted second domain node is on the one or more interdomain paths;

based on the abstracted second domain node being on the one or more interdomain paths, including one or more resources within the second network domain in the filtered TED.

12. The network element of claim 11, wherein the control unit is further configured to:

determine whether the abstracted second domain node meets a constraint, wherein including the one or more resources within the second network domain in the filtered TED is further based on the abstracted second domain node meeting the constraint.

13. The network element of claim 11, wherein the control unit is further configured to:

determine whether a first border node associated with the second network domain is associated with at least one express segment, wherein to include the one or more resources within the second network domain in the filtered TED, the control unit is configured to, based on the first border node being associated with at least one express segment, include one or more of the at least one express segments within the second network domain in the filtered TED.

14. The network element of claim 13, wherein to include the one or more resources within the second network domain in the filtered TED, the control unit is configured to:

determine whether a first express segment established between the first border node and a second border node associated with the second network domain is on the one or more interdomain paths based on whether the first border node and the second border node are associated with other network domains having abstracted domain nodes on the one or more interdomain paths; and based on the first express segment being on the one or more interdomain paths, include the first express segment into the filtered TED.

15. The network element of claim 14, wherein the control unit is further configured to:

determine whether a second express segment established between the first border node and a third border node associated with the second network domain is on the one or more interdomain paths based on whether the first border node and the third border node are associated with other network domains having abstracted domain nodes on the one or more interdomain paths; and based on the second express segment not being on the one or more interdomain paths, filter out the second express segment from the filtered TED.

16. The network element of claim 13, wherein the abstracted interdomain network topology further comprises an abstracted third domain node, and wherein the abstracted third domain node comprises an abstraction of a plurality of nodes within a third network domain, wherein the control unit is further configured to:

determine whether the abstracted third domain node is on the one or more interdomain paths;

based on the abstracted third domain node being on the one or more interdomain paths determine whether a fourth border node associated with the third network domain is associated with at least one express segment;

based on the fourth border node not being associated with at least one express segment, including one or more links and one or more nodes within the third network domain into the filtered TED.

17. The network element of claim 9, wherein the network element comprises a router.

18. The network element of claim 9, wherein the network element comprises a network controller.

19. The network element of claim 9, wherein the control unit comprises a path computation element (PCE).

20. A non-transitory computer-readable storage medium storing instructions, which, when executed, cause one or more processors to:

determine an egress network domain identifier (ID) of an egress network domain;

based on the egress network domain ID, determine an abstracted interdomain network topology, wherein the abstracted interdomain network topology comprises an abstracted ingress domain node, an abstracted egress domain node, and an abstracted first domain node, wherein the abstracted ingress domain node comprises an abstraction of a plurality of nodes within an ingress network domain, wherein the abstracted egress domain node comprises an abstraction of a plurality of nodes within the egress network domain, and wherein the abstracted first domain node comprises an abstraction of a plurality of nodes within a first network domain;

determine one or more interdomain paths from the abstracted ingress domain node to the abstracted egress domain node;

determine whether the abstracted first domain node is on the one or more interdomain paths;

based on the abstracted first domain node not being on the one or more interdomain paths, filter out one or more resources within the first network domain from a filtered traffic engineering database (TED); and compute a path from an ingress node within the ingress network domain to an egress node within the egress network domain based on the filtered TED.

* * * * *